United States Patent Office 2,877,168
Patented Mar. 10, 1959

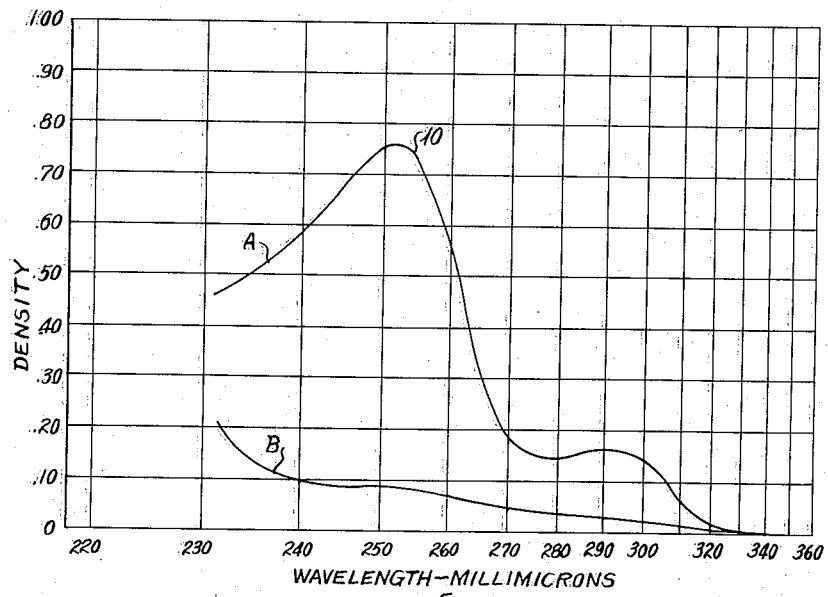
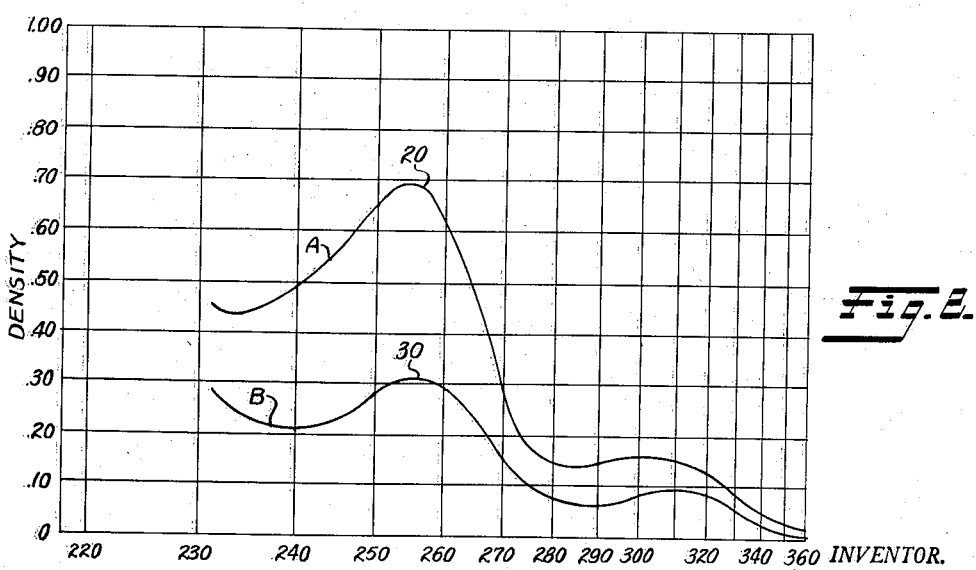

2,877,168

CYANIDE OF ACID FUCHSINE, METHOD OF PREPARING THE SAME, AND PHOTOCHEMICAL PROCESS

Lyman Chalkley, Prince Georges County, Md.

Application July 1, 1957, Serial No. 669,005

3 Claims. (Cl. 204—158)

The present invention relates to a hydrophilic p-amino triphenylmethane dye cyanide and, more particularly, to the cyanide of Acid Fuchsine, Color Index No. 692.

It has long been known that certain of the triphenylmethane dyes which contain at least one amino group para to the central methane carbon atom form colorless cyanides which in the presence of suitable organic activators become photosensitive to ultraviolet and shorter wave length of light to produce colored compounds but which are not sensitive to light in the visible range. Because of this property, the substances may be used in solution and absorbed or coated on a suitable base in the presence of an activator for the recording and measurement of ultraviolet radiation. Expensive equipment, such as quartz spectrographs and photoelectric meters, is ordinarily used to isolate this region.

Papers prepared from one of the photosensitive compounds and an activator therefor may be used in photographic and photoduplication processes to print out images that are fully formed without development, that may be permanent and that may be examined in ordinary interior illumination without fixing. The papers employed retain their ultraviolet sensitivity after the printing of one image so that other portions may be printed on at a later date.

However, all of the known p-amino triphenylmethane dye cyanides have been hydrophobic in nature and are not activated by water so as to provide useful systems photosensitive to ultraviolet and shorter wave lengths.

I have found that new compounds which comprise p-amino triphenylmethane dye cyanides having in the molecule at least one hydrophilic group, such as the sulfonic acid, quaternary ammonium or hydroxyl group, are hydrophilic in character and that the potential sensitivity to ultraviolet radiation possessed by the known hydrophobic dye cyanides is not lost in the new compounds. In fact, unlike the previous hydrophobic p-amino triphenylacetonitriles, the new compounds are activated by water alone. It will be understood, of course, that more than one type of hydrophilic group may be present in the same molecule of dye cyanide. The present invention relates to such dye cyanides having at least one sulfonic acid group in the molecule, the position or positions of such group corresponding specifically to those of the parent dye, Acid Fuchsine.

The sulfonic acid group is a highly ionized salt-forming radical. The essential part of the dye cyanide containing this group comprises the ion, $RSO_3^-$. This ion, because of its strongly hydrophilic character, confers the desired hydrophilic properties upon the triphenylacetonitrile. However, the ion alone, of course, does not constitute a complete neutral molecule and, therefore, the sulfonic ion is always combined with an ion of opposite charge in a complete molecule. Thus, the sulfonic ion is combined with a cation, which may be hydrogen or a metallic ion or ammonium.

The nature of the cation with which the sulfonic ion is combined is not at all critical. In aqueous solution in which these triphenylacetonitriles are photosensitive, the sulfonic acid group is largely ionized and the cation is no longer even a part of the molecule under the conditions in which the dye cyanides are utilized to take advantage of their photochemical properties. Therefore, any cation may be used with the sulfonic acid group to prepare a satisfactory hydrophilic dye cyanide.

For matters of convenience, selected ions are combined with these groups. Thus, the salts of the sulfonic acid groups are generally quite soluble in water. In order to obtain compounds which crystallize well, certain cations for the sulfonic acid group, such as sodium, potassium, calcium, strontium, and barium, have been utilized especially.

It is the object of the present invention to provide a new p-amino triphenylacetonitrile which is hydrophilic and is activated by water to form a colored compound on exposure to ultraviolet and short wave lengths.

Another object of the invention is to provide a hydrophilic p-amino triphenylmethane dye cyanide which will undergo photolysis to yield a strongly colored compound under conditions of quite high acidity.

Still another object of the invention is to provide a process for preparing the present new compound.

A further object of the invention is to provide a photochemical process employing the present new compound.

Other and further objects of the invention will be apparent from the following detailed description thereof in conjunction with the accompanying graphs, Figure 1 showing the absorption spectra of Rosaniline Cyanide at neutrality and in $$\frac{N}{10} \text{ HCl solution}$$

and Figure 2 showing the absorption spectra of Acid Fuchsine Cyanide under these same conditions.

I have prepared the cyanide of Acid Fuchsine, Color Index No. 692, and have found it to have unexpectedly advantageous properties which make it particularly valuable for use in actinometry and for photographic and photocopying applications. The dye, Acid Fuchsine, comprises sulfonic acids of rosaniline or pararosaniline and mixtures of these dyes.

The formulas for some of the components of Acid Fuchsine Cyanide are as follows:

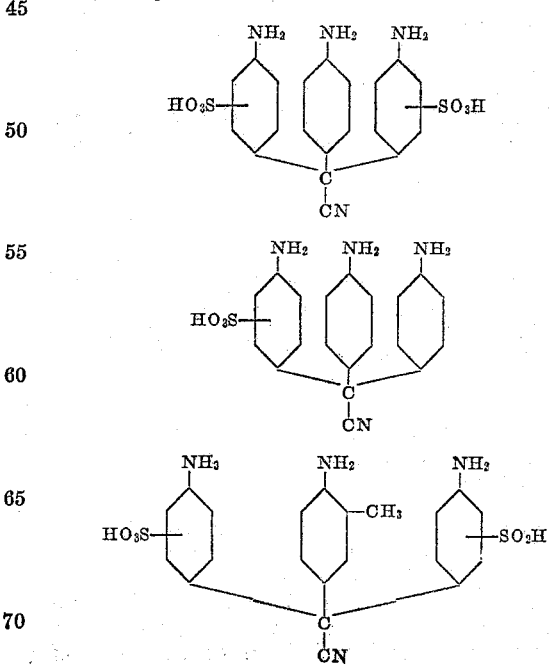

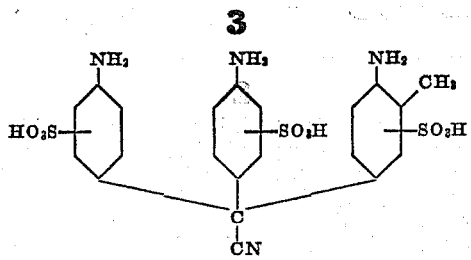

The product may contain not only any or all of these forms, but other forms as well corresponding to the various components of the dyestuff of Color Index No. 692. All of these forms, however, are embraced by the formula

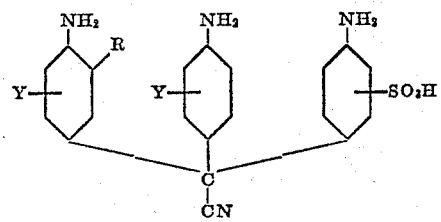

where R is hydrogen or a methyl group and Y is hydrogen or an —SO$_3$X group, and X is a cation. This formula defines Acid Fuchsine Cyanide and distinguishes it from the cyanide of all other dyes.

Acid Fuchsine Cyanide is less basic than other dye cyanides and requires much stronger acid for conversion to its neutral salt, such as the trihydrochloride. Therefore, even in strongly acid solution it retains strong sensitivity in the 2500–3300 A. region, which is lost by other dye cyanides in acid. Thus, whereas the Patent Blue type dye cyanides form novel monoacid salts at about pH 3 or 4 and other dye cyanides exist as normal salts wherein the free amino groups are completely neutralized, in acid systems having a pH of around 1.0, Acid Fuchsine Cyanide is converted only partly to the salt in which the amino groups are neutralized by acid in acid systems of such relatively high acidity, and in such systems will continue to exhibit much of the absorption and photochemical characteristics of the free amino compound. Upon photolysis, such acid systems also will form a stable magenta color.

This property of Acid Fuchsine is illustrated clearly by the graphs designated Figures 1 and 2, respectively. In Figure 1 the curve A represents the ultraviolet absorption spectrum of the corresponding unsulfonated dye cyanide, Rosaniline Cyanide, in 2.5×10⁻⁵ molar neutral solution in i-propyl alcohol, a photoactivator for the dye cyanide. The curve B represents a similar solution containing $$\frac{N}{10} \text{ HCl}$$

It will be observed that the peak 10 of curve A characteristic of the presence of free amino groups has substantially disappeared in the acid solution. The dye cyanide in the acid solution shows a shift in absorption characteristics such that it is no longer appreciably sensitive to the longer wave ultraviolet, e. g., sunlight. Moreover, the color produced by irradiation with even short-wave ultraviolet is no longer magenta but a degraded and weak blue or green that, in aqueous solutions tends to fade badly.

In Figure 2, the curve A represents the ultraviolet absorption spectrum of a neutral aqueous solution of 15 mg. per liter of Acid Fuchsine Cyanide, which is quite soluble in water. Water alone, as has been stated earlier, is a photoactivator for the hydrophilic dye cyanide. The curve B represents a similar solution made .1 normal with HCl. It will be seen that in the case of Acid Fuchsine Cyanide, the peak 20 of curve A has not disappeared in curve B but persists in the peak 30 with a density of nearly 50 percent of that of the original dye cyanide. As would be expected from the illustrated relationship, solutions of Acid Fuchsine Cyanide as acid as pH 1 undergo photolysis on irradiation with wave lengths effective with the original dye cyanide. Also, the image formed is a stable magenta color.

Because of its high solubility, Acid Fuchsine Cyanide is useful for combining with other hydrophilic dye cyanides in the preparation of sensitized materials that print images of colors unobtainable from single dye cyanide sensitizers, and that also have increased printing speeds.

Methods for the preparation of Acid Fuchsine Cyanide are shown in the following examples, although the product may be prepared by other methods as well.

*Example 1*

Fifty ml. of fuming sulfuric acid, 60% SO$_3$, is put in a flask equipped with a strong stirrer and a thermometer. Ten g. of finely powdered 4,4',4''-triamino-triphenylacetonitrile is added very slowly to the stirred acid, the initial temperature of both reagents being 25° C. Heat is evolved by the reaction, and the addition of the nitrile is controlled so that the temperature of the mixture in the flask does not rise above 60° C. When all of the nitrile has been added, stirring is continued for one-half hour, and the mixture is then poured onto 300 g. of powdered ice. The resulting solution is filtered from a little tar, boiled with activated charcoal, filtered, and the filtrate neutralized by addition of excess calcium carbonate suspended in one liter of water. The solution is heated to boiling, filtered from the precipitated calcium sulfate and excess calcium carbonate, the filtrate evaporated to a volume of 150 ml. and filtered hot again from the newly formed calcium sulfate. The filtrate is further evaporated to 55 ml., filtered hot from calcium sulfate and the filtrate cooled and allowed to stand in the dark at 15° C. for 24 hours. The precipitated calcium salt of Acid Fuchsine Cyanide is collected on a filter, pressed between dry filter papers to remove mother liquor, and dried in vacuo over sulfuric acid. The yield is about 8 grams. The product forms solutions in water and alcohol that develop an intense magenta color on exposure to ultraviolet of wave lengths shorter than about 3250 A.

The obtaining of Acid Fuchsine Cyanide by this method of direct sulfonation of the acetonitrile is unexpected since, as is well known, treatment of a nitrile with strong acid ordinarily results in hydrolysis of the cyano group. In place of the fuming sulfuric acid of the example, other sulfonating agents may be employed, such as chlorosulfonic acid.

*Example 2*

A solution of 5 g. of Acid Fuchsine, National Aniline Certified Biological Stain, 64% dye content, in 50 ml. of water is treated with 1 g. of 95% sodium cyanide, and the solution sealed in a pressure bottle and heated at 100° C. for 1 hour. The bottle is then cooled, opened, and the brown solution filtered from a slight impurity. The filtrate is boiled with activated charcoal which removes the brown color, and filtered. In a good hood the filtrate is made just acid with 64% sulfuric acid and evaporated to dryness in vacuo at 30° C. The resulting hygroscopic mixture of Acid Fuchsine Cyanide and sodium sulfate is satisfactory for many purposes. It may be further purified by extraction of the dye cyanide with boiling 90% i-propyl alcohol and evaporation of the alcohol.

This application is a continuation-in-part of my copending application, Serial Number 550,773, filed December 2, 1955, now abandoned.

I claim:

1. A process for forming a colored compound comprising irradiating with ultraviolet light in the presence of an activator consisting of water, a hydrophilic dye cyanide having the formula

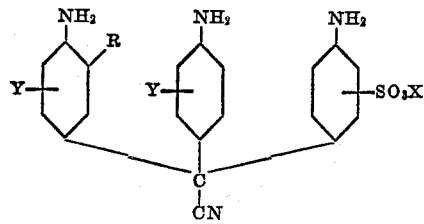

where R is a member selected from the group consisting of a hydrogen atom and a methyl group, Y is a member selected from the group consisting of a hydrogen atom and an —$SO_3X$ group and X is a cation.

2. The process of preparing a hydrophilic dye cyanide having the formula

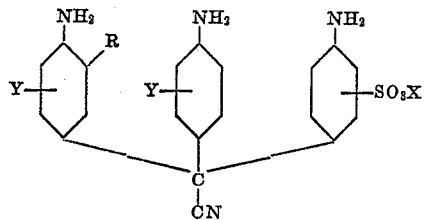

where R is a member selected from the group consisting of a hydrogen atom and a methyl group, Y is a member selected from the group consisting of a hydrogen atom and an —$SO_3X$ group and X is a cation, which process comprises reacting a p-aminotriphenylmethane dye cyanide having the formula

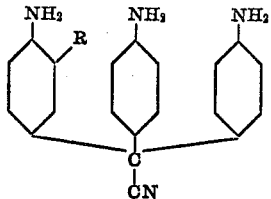

where R has the above meaning with a strong sulfonating agent and separating said hydrophilic dye cyanide from the reaction mixture.

3. A process for forming a colored compound, comprising irradiating the hydrophilic dye cyanide having the formula

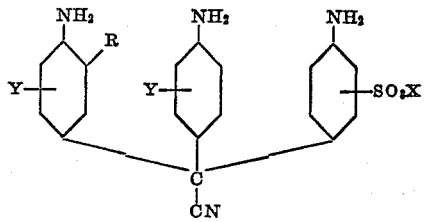

where R is a member selected from the group consisting of a hydrogen atom and a methyl group, Y is a member selected from the group consisting of a hydrogen atom and an —$SO_3X$ group and X is a cation, with ultraviolet light in a strong acid system containing a photoactivator for said hydrophilic dye cyanide.

References Cited in the file of this patent
UNITED STATES PATENTS

| | | |
|---|---|---|
| 2,150,695 | Muehler | Mar. 14, 1939 |
| 2,325,037 | Chalkley | July 27, 1943 |
| 2,441,561 | Chalkley | May 18, 1948 |
| 2,469,682 | Dickey | May 10, 1949 |
| 2,732,337 | Togel | Jan. 24, 1956 |
| 2,734,027 | Nickerson | Feb. 7, 1956 |